INVENTOR
Alfred C. Schroeder
BY
ATTORNEY

Sept. 18, 1962 A. C. SCHROEDER 3,054,852

COLOR TELEVISION

Filed Feb. 27, 1951

2 Sheets-Sheet 2

INVENTOR
Alfred C. Schroeder
BY
[signature]
ATTORNEY 3,054,852

COLOR TELEVISION

Alfred C. Schroeder, Southampton, Pa., assignor to Radio Corporation of America, a corporation of Delaware Filed Feb. 27, 1951, Ser. No. 213,002
2 Claims. (Cl. 178—5.2)

This invention relates to apparatus and methods for transposing a first set of signals at least some of which are combinations of color signals to a second set of signals representing the separate colors.

In deriving color signals for television receivers, it is sometimes desirable to employ a black and white pickup tube and two separate color pickup tubes. It has previously been suggested that the outputs of the two color tubes be added together and the result subtracted from the output of the black and white tube so as to derive signals representative of the third color.

In certain color transmission systems, the color information is carried by modulations on different phases of a subcarrier. The products of such modulations are combined before transmission to form a composite color signal. It would, of course, be possible to derive the color information as to each color from a separate pickup tube and apply the outputs of each pickup tube to one of the modulators. However, in such systems, it is generally necessary to provide a luminosity signal and this may be done by adding the color signals. If fine detail is to be produced in brightness by means of such a luminosity signal, such a system requires that the signals from the different color pickup tubes be carefully registered.

In order to avoid the need for such precise registry, it has been suggested that the luminosity signals be derived from a black and white camera of the type now used in black and white transmission. This luminosity camera in effect adds the separate color signals, but, inasmuch as they are derived from one tube, they are properly registered.

Rapid changes of color from one hue to another need not be transmitted as the eye is partially color blind when the changes are sufficiently rapid. Thus, it has been suggested that the color information be derived in one of two ways. A separate color pickup tube has been employed to derive the low-frequency variation of each color. Alternatively, the low-frequency portion of the outputs of two separate color pickup tubes have been added together and the result subtracted from the low-frequency portion of the signals provided by the tube deriving the luminosity signal so as to derive the third color signal. In either case, signals representing single colors have been applied to separate modulators.

In accordance with the principles of this invention, however, the output of the luminosity pickup tube can be applied directly to a modulator and the output of two separate color tubes can be applied to their respective modulators in such fashion that the combined outputs of the modulators can provide a resultant composite color signal which is the same as that which would be produced had the individual color signals been applied to the separate modulators. In this way, the necessity of providing an extra color pickup tube or of adding the two color signals together and subtracting the result from the luminosity signal in order to derive the third color signal is avoided.

Briefly, this is accomplished by selecting gains and phases in the modulation channels so that the components of a given color, whether they be provided by a single modulator or a plurality of modulators combine to produce a desired resultant.

This invention is also applicable to television color receivers adapted to reproduce colored images from subcarriers that are phase modulated in accordance with the resultant hue. Such a subcarrier may be built up at the transmitter by modulating different phases of the subcarrier wave with different component color signals and combining the outputs. In one type of signal transmission, the color signals applied to the modulators at the transmitter are separated out at a receiver by beating the composite color signal with a subcarrier wave having phases corresponding to those that were supplied to the modulators at the transmitter. This is the well known technique of zero beating or homodyning. In this type of signal transmission, the relative phases of subcarrier wave modulation and the gains of the modulators at the transmitter may be so chosen that the signals separated out at the receiver are different combinations of the three color signals, each combination representing one color minus luminosity signal. The combinations of color signals should be such that the color signals themselves may be obtained by adding the luminosity signal to each of the separated combinations of color signals. In other types of signal transmission, the subcarrier wave is modulated at the transmitter with the color signals at such relative phases and amplitudes that the phases of the subcarrier wave employed at the receiver for homodyning are different from the transmitter modulation phases in order to properly recover at the receiver the different color minus luminosity signals. In this latter type of system, the application of the homodyning principle wherein the composite color signal is beaten with subcarrier wave corresponding in phases to those of the subcarrier at the transmitter would produce signals that represent undesired combinations of color. Such signals are not directly useful in the color receiver and must be transformed to signals representative of the different color minus luminosity signals.

In accordance with a method employing the principles of this invention, the separate colors can be derived by changing the phases of the subcarrier wave applied to the different modulators in the receiver and by controlling the gain in the different modulation channels. In the first type of signal transmission referred to in the preceding paragraph, the subcarrier wave applied to a receiver modulator which is to provide a single color minus luminosity signal at its output has the same phase as the resultant of the components of this color in the received composite signal. Thus, for example, if at the transmitter the red video signal should be applied to two different modulators, the modulator at the receiver, which is to segregate out this red video signal, would be operated at a phase which is the same as the resultant red signal obtained by combining the outputs of the two modulators at the transmitter. The gains in the different modulation channels are chosen so as to make the resultant signal representing a single color have the same relative value as the light of that color had in the original image. Thus, if each color is assumed to have an amplitude of unity at the object, the gains in the modulation channels are adjusted so that the resultant signal for each color has a value of unity. The exact manner in which this is accomplished will become more evident in the detailed discussion below.

It is an object of this invention to provide improved means and method whereby a first set of signals, at least one of which is a combination of separate variables are transformed into a second set of signals uniquely representative of the individual variables.

The invention will be better understood from a detailed consideration of the drawings in which.

Figure 1:
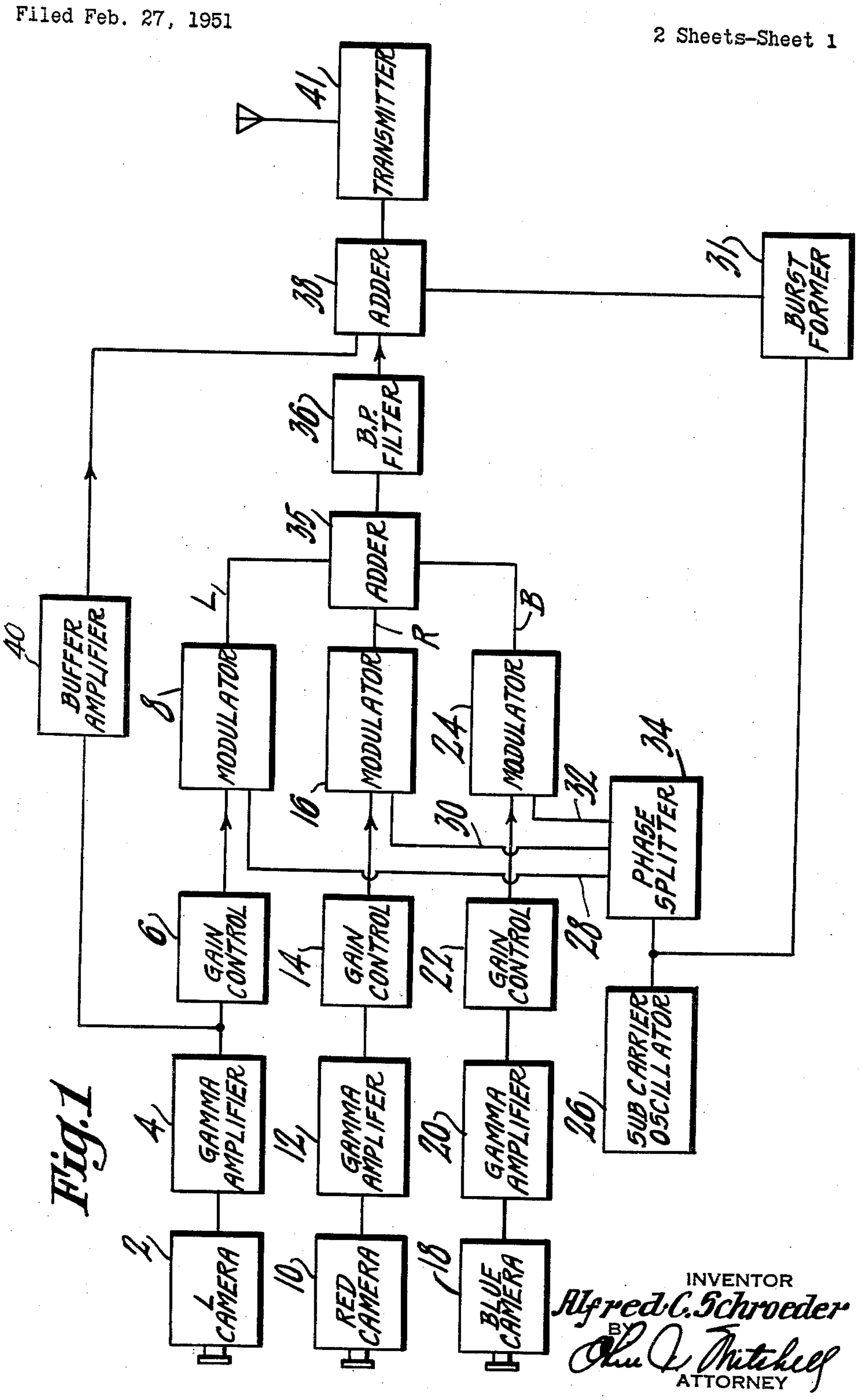
FIGURE 1 shows in block diagram form a signal generating apparatus of the type that is the subject of this invention.

A luminosity signal supplied by a camera 2 of FIGURE 1 is passed through a modulator, a gamma control amplifier 4, a gain control 6, to a modulator 8. The luminosity signal is generally comprised of energy derived from each color light in the object. In a similar fashion, red video signals supplied by a pickup camera 10 are supplied by a gamma amplifier 12 and a gain control 14 to a modulator 16. In a corresponding manner, the blue video signals supplied by a camera 18 are supplied via a gamma amplifier 20 and a gain control 22 to a modulator 24. The gamma amplifiers 4, 12, and 20 pre-distort the amplitude characteristics of the signal so as to counteract the effect of the kinescope characteristic employed in the television receivers in a manner well known to those skilled in the art. The gain controls 6, 14, and 22 are shown separately, but it will be understood that they could be incorporated in the corresponding gamma amplifiers or in the corresponding modulators whichever is more convenient in a particular construction.

A subcarrier wave is supplied by a sampling oscillator 26 and appears in different phases at the outputs 28, 30 and 32 of a phase splitter 34. A phase splitter is construed, for purposes of this discussion, to be any means for applying a signal frequency at a plurality of different phases. It may be comprised, for example, of a series of delay lines or it may be comprised of parallel R-C networks. Each of the differently phased subcarrier signals provided by the phase splitter 34, however, is applied to a different modulator, the output on the lead 28 being connected to the modulator 8, the output on the lead 30 being connected to the modulator 16, and the output on the lead 32 being connected to the modulator 24. In this way, one phase of the subcarrier is modulated in the modulator 8 by the luminosity signal, another phase of the subcarrier wave is modulated in the modulator 16 by the red video signal and the other subcarrier wave phase supplied to the modulator 24 is modulated by the blue video signal.

It will be noted that the outputs of the modulators 8, 16, and 24 are all combined in an adder 35 before being supplied to a bandpass filter 36. When different phases of a subcarrier wave are added together, the resultant is a subcarrier having a phase determined by the relative amplitude of the signals applied to the different modulators. For example, if the signals applied to the modulators 16 and 24 are of zero amplitude and the signals applied to the modulator 8 have some amplitude, the phase of the subcarrier resulting from the combination of the outputs of the modulators is the same as the phase of the subcarrier wave applied to the modulator 8 via the lead 28. Now if the modulator 16 also receives a signal from the gain control unit 14, the resultant subcarrier has a phase lying between the phases of the subcarrier wave supplied to the modulators 8 and 16.

The output of the bandpass filter 36 is coupled to an adder 38. The luminosity signal at the output of the gamma amplifier 4 is also coupled to the adder 38 via a buffer amplifier 40. It the desired color information is limited to relatively low frequencies, these low frequencies will appear at the output of the modulators 8, 16, and 24 as sidebands. These sidebands are selected by the bandpass filter 36.

Bursts of the subcarrier wave derived from subcarrier oscillator 26 are selected by a burst former 31 and applied to the adder 38 in order that the subcarrier wave source in the receiver may be synchronized. Such a burst selector may take the form of a monostable multivibrator triggered by the horizontal sync driving pulse normally present in televison transmission equipment. This portion of the apparatus need not be described further as it does not constitute a part of the invention. Mention of its existence is made for the sake of completeness. The transmitter is shown in block 41. A good quality video transmitter may be employed for the practice of this invention. One suitable type transmitter is very well shown and described in an article entitled "TT-5A Television Transmitter" by C. D. Kentner, Broadcast News for March 1948.

The operation of the apparatus shown in FIGURE 1 will now be explained in connection with the vector diagrams of FIGURES 2 through 4. Let us assume that the black and white (BW) or luminosity (L) signal provided by the camera 2 of FIGURE 1 is comprised of green (G), red (R), and blue (B) components having their ratios indicated in the following expression:

(*a*) $BW=.600G+.333R+.067B$

Each modulator is assumed to be modulated with a signal of unity amplitude. Actually, the ratios in the expression (*a*) are substantially the same as those produced by the human eye. In other words, the human eye is more sensitive to green than it is to red and more sensitive to red than it is to blue. New suppose that it is desired to transmit the color signals so that their resultant is indicated by the following expression:

(*b*) $.692G\angle 0°+.667R\angle 150°+.352B\angle 251°$

Such a signal more faithfully represents the brightness variations that the eye would see, as the eye is more sensitive to red and green than to blue. Therefore, a black and white receiver can produce an image having better brightness fidelity. In a color receiver, these colors are restored to unity value for unit inputs. The color signals are thus represented by three vectors having the relative amplitudes indicated by the coefficients before the letters "G," "R," and "B" and at the angles of 0°, 150°, and 251°, respectively. This situation is represented by the solid vectors in FIGURE 2. If the green, red, and blue signals were separately formed, as previously discussed, their amplitude would be controlled so as to render the ratios as indicated in the expression (*b*) and the phases of the subcarrier supplied by the phase splitter 34 to the modulators 8, 16, and 24 would be 0°, 150°, and 251°, respectively.

However, it will be noted that in this invention, the luminosity signal instead of the green signal is supplied to the modulator 8. Under these conditions, if the subcarrier wave phases and amplitudes of the signals passing through the different modulators of FIGURE 1 are such as indicated by the dotted arrows of FIGURE 2, the resultant subcarrier wave constituting the color signal and appearing at the output of the adder 35 of FIGURE 1 will be the vectorial resultant of the solid arrows.

Assume for purposes of explanation that the subject being scanned by the cameras 2, 10, and 18 is a pure green. The only channel capable of carrying signals representing brightness variations of green is the luminosity channel including the modulator 8, as green light does not reach the red camera 10 or the blue camera 18. Therefore, the signal emerging from the modulator 8 would have a relative amplitude of .600G instead of .692G, as desired. The amount of green can be obtained by setting the gain control 6 so that the signals received from the luminosity camera 2 are multiplied by a factor of 1.15. The phase of this modulated subcarrier is the reference wave and is assumed to be 0°.

If we have a red signal alone, the 0° modulator 8 will provide a signal due to the red light of $.333R \times 1.15$. In addition, the modulator 16 will provide a signal representative of red variations in intensity from the red camera 10. If it is desired that the resultant of these two signals be $.667R\angle 150°$, the gain of the gain control 14 in the red modulator channel may be made equal to 1.02 and the phase angle of the subcarrier applied to it 160.9°. The desired resultant signal represented by the solid vector R is thus equal to the vectorial sum of the R vector at zero degree and the dotted vector R'. In a similar way, it can be seen from the solution of the vectorial problem that the blue channel must have a gain of .384 and the phase angle of the subcarrier provided to the modulator 24 must be 240°.

In this example, the resultant color signal appearing at the output of adder 35 of FIGURE 1 is one which may be modulated at a receiver with 0°, 150° and 251° phases of the subcarrier wave to produce the desired green, red and blue minus luminosity signals for combination with the luminosity signal to recreate the complete green, red and blue color signals. This operation is such that the receiver modulators are supplied with the same phases of the subcarrier wave as those which are effectively modulated at the transmitter as explained with reference to FIGURE 2.

Figures 2, 3, 4, 5, 6:
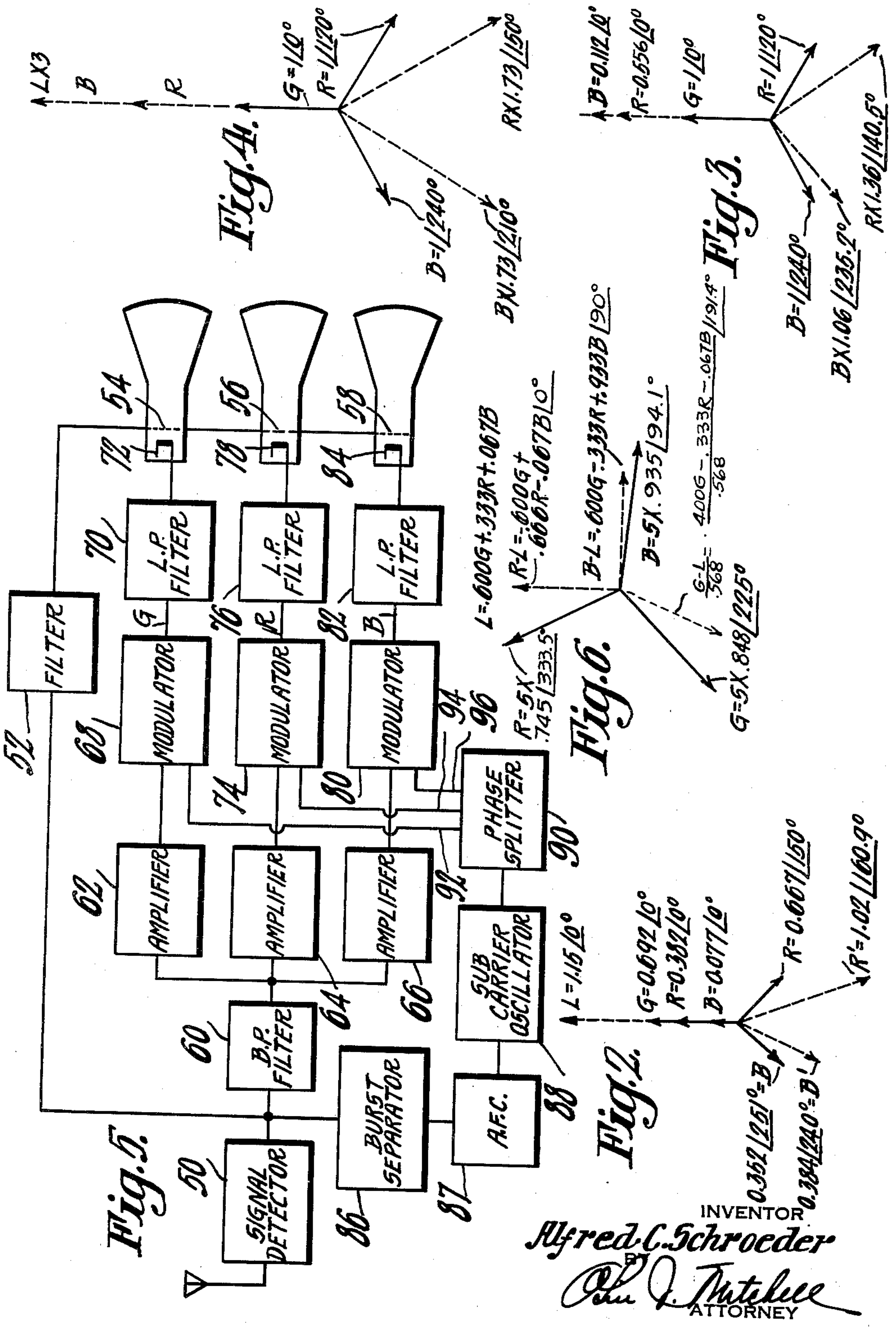
FIGURE 2 is a vector diagram illustrating the operation of this invention wherein it is desired to produce signals of the type obtained by asymmetrical sampling.
FIGURE 3 is a vector diagram to be used in the explanation of the operation of this invention in a color television system wherein asymmetrical sampling is employed and wherein the luminosity signal corresponds to the eye characteristic.
FIGURE 4 is a vector diagram illustrating the operation of this invention wherein asymmetrical sampling is employed in a system employing panchromatic luminosity signals.
FIGURE 5 illustrates the application of the principles of this invention to a color television receiver.
FIGURE 6 is a vector diagram used in the explanation of the application of the modulator of this invention to the receiver of the type shown in FIGURE 5.

FIGURE 3 illustrates in vectorial form the manner in which a luminosity signal and two color signals may be operated on so as to produce the same signal that would be created if three different color signals were applied to modulators operated 120° phases with respect to one another. Assume that the luminosity signal provided by the camera 2 of FIGURE 1 has the characteristic of the human eye, as indicated by the expression (*a*).

If it is desired to produce a green signal represented by a vector of unity amplitude at an angle of 0°, it is only necessary to multiply the luminosity signal provided by the modulator 8 by a factor of 1.67 ($1.67 \times .600 = 1$). The dotted vectors in line with the solid green vector at 0° show that the red and blue components of the luminosity channel are also multiplied by the same factor of 1.67.

Assume that the picture being transmitted contains only red color, then the red supplied by the luminosity camera 2 through the modulator 8 and by the red camera 10 through the modulator 16 must combine to produce a red signal having unity amplitude at an angle of 120°.

The gain and phase angle of the luminosity channel have already been determined in order to supply a desired green signal to the adder 35. Therefore, the red channel alone must have its gain and the phase angle of its subcarrier supplied to the modulator 16 controlled so as to supply the proper amount of red signal to the adder 35. The proper gain and phase angle can be determined by subtracting the red contribution of the luminosity channel, which is a vector $.556R\angle 0°$ from the desired resultant, which is a vector $R \times 1\angle 120°$. This yields the dotted vector $R \times 1.36$, which represents the red signal multiplied by a factor of 1.36 and used to modulate a subcarrier having a relative phase angle of 140°.

The desired blue vector has a unity amplitude and is at an angle of 240°. The subtraction of the blue component of the luminosity signal, as it appears in the output of the modulator 8 from this vector, yields a dotted vector having an amplitude equal to the blue signal times $1.06\angle 235.2°$.

FIGURE 4 illustrates the application of the principles of this invention to a signal generating equipment wherein the luminosity camera 2 is panchromatic. That is to say, the sensitivity of the luminosity pickup tube to each of the different colors in the system is the same and can be represented by the expression:

$$(c) \qquad BW = .333R + .333G + .333B$$

Assuming that it is again desired to produce the type of signal that would be produced when the different color signals modulate different subcarriers at 120° phases, the following procedure can be followed. As in our previous examples, the gain in the luminosity channel is determined by the required amount of green in the output signal. In a panchromatic signal, each of the colors represents one-third of the luminosity signal, and, therefore, if the luminosity signal is multiplied by three, each of the colors in this amplified signal will have an amplitude of unity as indicated in FIGURE 4. Therefore, the adjustment of the gain control 6 in the luminosity channel will be such as to give the luminosity signal a relative gain of 3. The green now appears at the output of the modulator 8 with unity relative amplitude and at an angle of 0°.

The desired red signal is represented by a solid vector at an angle of 120° with respect to the green signal. Signals representative of the red information appear both in the luminosity channel and in the red channel, as was previously discussed. At the output of the modulator 8 in the luminosity channel, the red has an amplitude of unity. If this is vectorially subtracted from the desired red signal $R \times 1\angle 120°$, the result is a vector equal to the red signal times $1.73\ \angle 150°$. This means that if the red channel has a relative gain of 1.73 and the phase of its subcarrier is at 150°, that the combined red signal will be $R \times 1\angle 120°$. In a similar way, the unity blue signal of 120° that is supplied by the modulator 8 in the luminosity channel can be subtracted from $B \times 1\angle 240°$, thus indicating that the blue signal should be multiplied by 1.73 and its modulator supplied with a subcarrier at 210° so as to yield the proper resultant.

FIGURE 5 illustrates the application of certain features of this invention to a color television receiver. The composite signal including both the color information and the intensity (i.e. luminosity) information is detected by a signal detector 50, and it is bypassed via a filter 52 to the grids 54, 56, and 58 of separate color reproducing means. The color information in the sidebands of the subcarrier is selected by a bandpass filter 60 and supplied to each of three gain controlled amplifiers 62, 64, and 66. The output of the gain controlled amplifier 62 is connected via a modulator 68 and a lowpass filter 70 to a cathode 72 of a color reproducing means including the grid 54. The output of the gain controlled amplifier 64 is coupled via a modulator 74 and a lowpass filter 76 to a cathode 78 associated with a grid 56. The output of the gain controlled amplifier 66 is connected via a modulator 80 and a lowpass filter 82 to a cathode 84 associated with the grid 58.

The burst of subcarrier frequency that appeared on the backporch of the composite television signal is separated by any standard burst separator 86 and applied to any standard type of automatic frequency control circuit 87. The control circuit 87 is coupled so as to control a local subcarrier oscillator 88. The subcarrier wave supplied by the oscillator 88 is split into different phases by any standard type of phase splitter 90. The phase splitter 90, for example, may be comprised of a series of delay lines. Each different phase of the output of the phase splitter 90 is supplied to a different one of the modulators 68, 74, and 80 via the leads 92, 94, and 96, respectively.

The operation of the receiver shown in FIGURE 5 will now be explained with the aid of the vector diagram shown in FIGURE 6. Assume that the ratios of the different colors in the luminosity signal are as indicated in the equation (*a*) above, which is repeated here for sake of convenience:

$$BW = .600G + .333R + .067B$$

Since the luminosity signal information is impressed upon the cathode ray tube grids 54, 56 and 58, the individual colors are produced by impressing the respective color minus luminosity signals upon the cathode ray tube cathodes 72, 78 and 84. In this manner, each color minus luminosity signal is combined with the luminosity signal to produce a complete color signal. With a luminosity signal (BW or L) as indicated in the above expression, the red, blue and green color minus luminosity signals are represented respectively by the following expressions:

$$(d)\qquad R-L=-.600G+.667R-.067B$$

$$(e)\qquad B-L=-.600G-.333R+.933B$$

$$(f)\qquad G-L=.400G-.333R-.067B$$

It is seen that, when each of the signals represented in expressions (*d*), (*e*) and (*f*) is added to the luminosity signal, as indicated in expression (*a*), the complete color signal at unity amplitude is produced. In each case, it is noted that the color minus luminosity signal is a combination of the three color signals. In accordance with this invention, the phases of the subcarrier wave which are modulated at the transmitter and the gains of the different modulators may be so chosen that color minus luminosity signals as represented in the expressions (*d*), (*e*) and (*f*) may be derived directly from the receiver modulators.

With some kinds of transmitted signals, the phases in which the receiver modulators are operated must be different from the phases at which the transmitter modulators are operated so as to be able to recover color information in the form of the desired color minus luminosity signals. A system employing such a mode of operation is indicated in the vector diagram of FIGURE 6. The modulating phases at the transmitter and the gain controls of the transmitter modulator circuits are so chosen that two of the receiver modulators may be operated at phases which differ from one another by 90°.

In this type of color signal transmission, assume that, at the transmitter, the 333.5° phase of the subcarrier is modulated with a red signal R at a gain of .745, the 94.1° phase is modulated with a blue signal B at a gain of .935 and the 225° phase is modulated with a green signal G at a gain of .848, as shown in FIGURE 6. It is to be understood from the foregoing description with reference particularly to FIGURES 2, 3 and 4 that the transmitter modulators alternatively may be supplied respectively with a luminosity signal and two color signals in such a manner as to produce the same composite color signal as if the modulators had been supplied with the three color signals in the manner indicated.

At a receiver, in order to provide a green minus luminosity (G—L) signal to the cathode 72, the gain control of the amplifier 62 must be set at a value of .568 and the phase of the signal fed to modulator 68 must be 191.4°. In order to impress a red minus luminosity (R—L) signal on the cathode 78, the received composite signal must be multiplied by a factor of 1.00 in the amplifier 64 and the phase of the subcarrier supplied by the lead 94 to the modulator 74 should be at an angle of 0°. In a similar way, in order to apply a blue minus luminosity (B—L) signal to the cathode 84, the incoming signal should be multiplied by a factor of 1.00 in the amplifier 66 and the phase of the subcarrier frequency applied by the lead 96 to the modulator 80 should be at an angle of 90°.

By reason of the described relationships between the components of the received signal as indicated in expressions (*a*), (*d*), (*e*) and (*f*), one of the modulators 68, 74 and 80 of FIGURE 5 may be omitted, if desired. In such a case, two of the color minus luminosity signals may be derived respectively from two modulators and the third color minus luminosity signal may be produced by suitable combination of the signals derived from the modulators. For example, the red minus luminosity signal (R—L) may be derived from modulator 74 and the blue minus luminosity signal (B—L) may be derived from the modulator 80 as described. The green minus luminosity signal (G—L) may be produced by combining the derived signals in accordance with the following expression:

$$(g)\qquad G-L=\frac{-.333(R-L)-.067(B-L)}{.600}$$

Expression (*g*) is derived by algebraic transposition of expression (*a*). Any of the other color minus luminosity signals may be produced in a similar manner from the remaining two signals.

The manner in which the color reproducing means including the cathodes 72, 78, and 84 and the grids 54, 56, and 58 operate to produce a colored image is not a part of this invention and need not be disclosed in detail. However, suffice it to say that the brightness signal, which is the amplitude modulation of the main carrier includes lower frequencies than the subcarrier frequency that carries the color information.

Having thus described my invention, what is claimed is:

1. Signal generating apparatus comprising in combination: a source of signals representative of luminosity of an image; a first source of signals representative of a first color of said image; a second source of signals representative of a second color of said image; a source of a plurality of phases of a wave of a given frequency; means for modulating one phase of said wave in accordance with said luminosity signal; means for modulating two other phases of said wave respectively in accordance with said first and second color representative signals; and means for combining said modulated waves into a composite signal wave.

2. Signal generating apparatus comprising in combination: a source of signals representative of luminosity of an image; a first source of signals representative of a first color of said image; a second source of signals representative of a second color of said image; a source of a plurality of phases of a wave of a given frequency; means for modulating one phase of said wave in accordance with said luminosity signal; means for modulating two other phases of said wave respectively in accordance with said first and second color representative signals; and means coupled to all of said modulating means and to said luminosity signal source for combining said modulated waves and said luminosity signal into a composite signal wave.

References Cited in the file of this patent

UNITED STATES PATENTS

| | | |
|---|---|---|
| 1,652,092 | Clement | Dec. 6, 1927 |
| 2,375,966 | Valensi | May 15, 1945 |
| 2,492,926 | Valensi | Dec. 27, 1949 |
| 2,493,200 | Land | Jan. 3, 1950 |
| 2,545,325 | Weimer | Mar. 13, 1951 |
| 2,567,040 | Sziklai | Sept. 4, 1951 |
| 2,580,903 | Evans | Jan. 1, 1952 |
| 2,627,549 | Kell | Feb. 3, 1953 |
| 2,728,813 | Loughlin | Dec. 27, 1955 |
| 2,773,929 | Loughlin | Dec. 11, 1956 |

OTHER REFERENCES

"A Six-Megacycle Compatible High-Definition Color Television System," by The Radio Corp. of America, before the FCC; September 26, 1949, 24 pages.

RCA Review, vol. XIV, No. 2, June 1953, pages 171, 174 and 195.